United States Patent
Wang et al.

(10) Patent No.: US 8,940,203 B2
(45) Date of Patent: Jan. 27, 2015

(54) METHOD FOR PREPARING COMPOSITION COMPRISING POROUS CERAMIC WITH THERMO-RESPONSE HYDROGEL

(75) Inventors: Chih-Kuang Wang, Kaohsiung (TW); Mei-Ling Ho, Kaohsiung (TW); Yin-Chih Fu, Kaohsiung (TW); Gwo-Jaw Wang, Kaohsiung (TW); Je-Ken Chang, Kaohsiung (TW)

(73) Assignee: Kaohsiung Medical University, Kaohsiung (TW)

( * ) Notice: Subject to any disclaimer, the term of this patent is extended or adjusted under 35 U.S.C. 154(b) by 444 days.

(21) Appl. No.: 13/080,960

(22) Filed: Apr. 6, 2011

(65) Prior Publication Data
US 2011/0248417 A1 Oct. 13, 2011

(30) Foreign Application Priority Data
Apr. 7, 2010 (TW) ................................ 99110691 A (51) Int. Cl.
| | | |
|---|---|---|
| *C04B 38/06* | (2006.01) | |
| *C04B 35/447* | (2006.01) | |
| *C04B 28/34* | (2006.01) | |
| *C04B 35/634* | (2006.01) | |
| *C04B 35/64* | (2006.01) | |
| *C04B 38/00* | (2006.01) | |
| *C04B 111/00* | (2006.01) | |

(52) U.S. Cl.
CPC ............. *C04B 35/447* (2013.01); *C04B 28/344* (2013.01); *C04B 35/63416* (2013.01); *C04B 35/63424* (2013.01); *C04B 35/63444* (2013.01); *C04B 35/64* (2013.01); *C04B 38/0045* (2013.01); *C04B 38/067* (2013.01); *C04B 2111/00836* (2013.01); *C04B 2235/6562* (2013.01); *C04B 2235/6565* (2013.01); *C04B 2235/6567* (2013.01)
USPC .......................................................... 264/43

(58) Field of Classification Search
CPC C04B 28/344; C04B 35/447; C04B 38/0045; C04B 35/63444; C04B 35/64; C04B 40/0268
USPC .......................................................... 264/43
See application file for complete search history.

(56) References Cited

U.S. PATENT DOCUMENTS

| | | | | |
|---|---|---|---|---|
| 3,905,047 A | * | 9/1975 | Long ............................ | 623/23.56 |
| 4,610,692 A | * | 9/1986 | Eitenmuller et al. .......... | 424/422 |
| 6,066,279 A | * | 5/2000 | Walls et al. .................... | 264/118 |
| 6,235,225 B1 | * | 5/2001 | Okada et al. .................... | 264/44 |
| 6,316,091 B1 | * | 11/2001 | Richart et al. .............. | 428/310.5 |

(Continued)

*Primary Examiner* — Erin Snelting
(74) *Attorney, Agent, or Firm* — WPAT, P.C.; Anthony King; Kay Yang (57) ABSTRACT

The present invention provides a method for preparing a composition comprising porous ceramic, comprising the following steps: (a) synthesizing poly(N-isopropylacrylamide-co-methacrylic acid) (p(NIPAAM-MAA)) or similar thermo-response compound thereof; (b) mixing a dispersant with hydroxyapatite or calcium phosphate salt; (c) mixing the p(NIPAAM-MAA) of the step (a) or similar thermo-response compound thereof with water to obtain a hydrogel solution; (d) mixing the hydrogel solution of the step (c) and product of the step (b) to produce a mixture; (e) adding macromolecular particles to the mixture of the step (d) and stirring to produce a slurry; (f) filling the slurry of the step (e) into a template slot; and disposing the template slot filling with the slurry of the step (f) on a crucible, then proceeding high temperature sinter in a furnace to form the composition comprising porous ceramic.

13 Claims, 5 Drawing Sheets

(56) References Cited

U.S. PATENT DOCUMENTS

| | | | |
|---|---|---|---|
| 7,514,024 B2* | 4/2009 | Matsumoto | 264/42 |
| 2003/0006534 A1* | 1/2003 | Taboas et al. | 264/401 |
| 2004/0043051 A1* | 3/2004 | Pilliar et al. | 424/423 |
| 2004/0248326 A1* | 12/2004 | Ziaie et al. | 438/1 |
| 2005/0124720 A1 | 6/2005 | Rizzoli et al. | |
| 2005/0184418 A1* | 8/2005 | Lin et al. | 264/43 |
| 2007/0178309 A1 | 8/2007 | Omelon | |
| 2009/0252795 A1 | 10/2009 | Smyth | |
| 2011/0022180 A1* | 1/2011 | Melkent et al. | 623/23.5 |
| 2011/0276025 A1* | 11/2011 | Wu et al. | 604/504 |
| 2011/0313538 A1* | 12/2011 | Oh et al. | 623/23.61 |
| 2012/0136088 A1* | 5/2012 | Aizawa et al. | 523/115 |

* cited by examiner

METHOD FOR PREPARING COMPOSITION COMPRISING POROUS CERAMIC WITH THERMO-RESPONSE HYDROGEL

FIELD OF INVENTION

The present invention relates to a process for preparing a composition comprising porous ceramic with thermo-response hydrogel.

DESCRIPTION OF PRIOR ART

Congenital or acquired bone defect is a major problem in orthopedic surgery. For healing the bone defect, about 15% patients have to be bone implanted (Urist 1994). Autologous bone graft can avoid infectious diseases and remain higher healing rate. Therefore, it is the most common way in bone graft. However, there are deficiencies in autologous bone graft, such as pain in bone obtained place, or less bone available, especially in consider with children (Glowwaacki et al 1981, Grob 1986, Dutting et al 1988). Potential disadvantages in bone allograft include: high cost load of bone bank, higher disease infectious rate, allogeneic bone fracture, and high un-healed rate. All mentioned above limit the practicability of bone allograft (Kotani et al 1992). In 1960s, a deproteinized calf-bone material was developed, which was proved to be a very forward-looking replacement for bone (Katthgen and Mittelmeier). Model using at that time was rabbit femoral distal condyle. Both iliac crest and femorl distal condyle feature rich in sponge bone and osteoblast. In addition, plenty of researches have shown that porous materials are better than dense materials in bone regeneration. Pore size also affects the osteoconduction, which contributes to new bone formation. A research has shown that at least 100 μm pores would be possible to make new bone ingrowth. In 1994, Kuhne et al implanted coral HAp with different pore sizes into rabbit femoral condyle. They discovered that no new bone generated into 200 μm-pore materials, but into 500 μm-pores materials, which explained the influence of the pore size of materials on bone generation. For biodegradable implants, porous morphology can increase the total area of the material to promote the degradation. The speed of vascular ingrowth into the implanted materials plays a key role in the success of bone ingrowth and implantation. Porous materials also provide a basis for vascular ingrowth. Though vascular ingrowth brings a variety of factors, mesenchymal cells, and other nutrients required for bone growth, the porous morphology of implants may significantly weaken the strength of the materials. Mechanical properties of porous implants are far less than dense materials. Thus, the location of transplantation should be considered when applying.

A good replacement of bone must be able to support and promote the growth of bone cells in precondition (Doherty et al 1987). Over the last decade, commercial grade phosphate bioceramic pieces have been applied in different clinical uses of bone defects one after another, which bring extremely high market value. However, in Taiwan, the price stays in high level since it still relies on import currently.

In recent times, surgery such as unhealed bone defect, necrosis, and dental implantation have been increasingly important in clinical practice. To achieve a good therapeutic effect, regeneration and junction of osseous tissue or adequacy of alveolus bone has become critical. Yet, these surgical operations often need to be achieved by autogenous bone graft. Fortunately, due to the development and improvement in biological and material technology, techniques such as bone graft fillers and guided bone regeneration (GBR) may help patients with rebuilding the bone tissue. Currently, artificial bone filling materials that are mainly used include biocompatible ceramic materials, natural or synthetic biological macromolecular compounds, or mixtures thereof.

The advantage in porous ceramics producing technique, which generally mixes polymer sponge with sintered ceramic slurry, is that microstructure is easy to control. However, these structures have low mechanical strength and are less uniform. Another technique called gel casting, which adds ceramic suspensions to a mixture of monomer, initiator, and formagen to form porous ceramics, which has higher mechanical strength, but worse microstructure.

SUMMARY OF THE INVENTION

The present invention develops porosity and process simplicity of a biomaterial scaffold by using a thermo-response hydrogel, and increases bioabsorbability by using bi-phase phosphate bioceramic structure in composition. More particularly, the present invention is related to a method for preparing a composition comprising porous ceramic with thermo-response hydrogel.

DETAILED DESCRIPTION OF THE INVENTION

The object of the present invention is to develop a scaffold made of porous calcium phosphate bioceramic composite with nano/micropores, which allows nutrients in body fluid and newborn vessels to access timely and to achieve good porosity, process simplicity and partial absorbability by body, and the present invention can be embedded or grafted with drugs of anti-inflammatory or bone growth improvement. Thus, the present invention develops porosity and process simplicity by using a thermo-response hydrogel, and increases bioabsorbability by using bi-phase phosphate bioceramic structure in compositions. The biomaterials mentioned above may even improve bone regeneration by mixing with bone marrow, which provides the effect of osteo-induction and osteo-genesis. This absorbable complex material can further be applied to forward-looking researches. For instant, orthopedic tissue engineering—covering and fixing various bone-inducibility of BMP growth factor, vascular endothelial growth factor (VEGF) or drugs such as statin, bisphosphanate, etc. for stimulating bone generation. It may also be implanted into bone cell and stem cell in vitro to achieve the best healing result or used as a carrier of cures such as antibiotics in concert with drug-deliver technique to treat bone disease, e.g. osteomyelitis and the like.

The inventor discovered several advantages in preparing porous ceramic with thermo-response hydrogel. For example, (1) thermo-response hydrogel can become contractible when the temperature is getting higher, which leads to densification in sintered powder; (2) thermo-response hydrogel stays in liquid phase in room temperature, providing feasibility in mixing process; (3) thermo-response hydrogel will not cause phase transition or cell toxic in response with hydroxyapitite (HAp); (4) thermo-response hydrogel remains pores and has the template function of micropores; and (5) it is capable of preparing porosity by adding second pore-forming agent.

As used herein, the term "thermo-response" refers to an ability to perceive hot and cold, as well as the temperature difference between external subjects.

As used herein, the term "hydrogel" means a gel, of which the liquid component is water. In the process, hydrogel may use lots of water for avoiding chemical solvent, leading to the characteristic of being full of water in the content and being similar to in vivo tissue. Thus, it may apply to the transfer of low molecular weight lipophilic drugs, hydrophilic drugs, and unstable biomoleculars such as protein and gene. It may also be used in cell fixing and tissue engineering. Besides, hydrogel is provided with biocompatibility and biodegradability in material, which can further be applied to in vivo experiments.

As used herein, the term "porous" or "porosity" refers to a plurality of pores which allow air or water to flow into slowly.

As used herein, the term "ceramic" refers to a non-metallic inorganic material, which is necessary of high temperature treatment or densification, comprising: silicate, oxide, carbide, nitride, sulfide, boride, and the like.

As used herein, the term "dispersant" refers to an agent making the material particles dispersed uniformly in the medium and form a stable suspension. Generally, dispersants are divided into two major categories, organic and inorganic dispersants. The common organic dispersants include: triethylhexyl phosphoric acid, sodium lauryl sulfate, methyl amyl alcohol, cellulose derivatives, polyacrylamide, Gul plastic, and ethylene fatty acid esters; and the common inorganic dispersants include: silicate (such as water glass) and the alkali metal phosphate (e.g. sodium tripolyphosphate, sodium hexametaphosphate and sodium pyrophosphate, etc.).

As used herein, the term "macromolecular" refers to a molecular with quite large molecular weight and is synthesized by certain polymerization.

As used herein, the term "biomaterial" relates to a non-viable material that is for medical device and is interacting with biological system.

As used herein, the term "a" or "an" are employed to describe elements and components of the invention. This is done merely for convenience and to give a general sense of the invention. This description should be read to include one or at least one and the singular also includes the plural unless it is obvious that it is meant otherwise.

As used herein, the term "or" are employed to describe "and/or".

Thus, the present invention provides a method for preparing a composition comprising porous ceramic, comprising the following steps:
    (a) synthesizing poly(N-isopropylacrylamide-co-methacrylic acid) (p(NIPAAM-MAA)) or similar thermo-response compound thereof;
    (b) mixing a dispersant with hydroxyapatite or calcium phosphates salts;
    (c) mixing the p(NIPAAM-MAA) of the step (a) or similar thermo-response compound thereof with water to obtain a hydrogel solution;
    (d) mixing the hydrogel solution of the step (c) and product of the step (b) to produce a mixture;
    (e) adding macromolecular particles to the mixture of the step (d) and stirring to produce a slurry;
    (f) filling the slurry of the step (e) into a template slot or any mold; and
    (g) disposing the template slot filling with the slurry of the step (f) on a crucible, then heating the cruicible in a furnace to form the composition comprising porous ceramic.

In one preferred embodiment, the hydroxyapatite or calcium phosphates salts are mixed with the dispersant of the step (b) in a weight percentage ranges from 25:1 to 25:5; the dispersant of the step (b) can be polyacrylic acid (PAA), polymethacrylic acid (PMA), or poly-vinyl-alcohol (PVA) and the like; the hydroxyapatite or calcium phosphate salts of the step (b) is sintered to the degree of 700° C.~900° C. in a high-temperature furnace before mixing; the p(NIPAAM-MAA) is mixed with the water of the step (c) in the volume ratio ranges from 1:10 to 2:1; the macromolecular particles of the step (e) have a volume equals to 5%~50% of the total volume of the mixture of the step (d); the template slot of the step (f) is polyester fiber porous template slot or alumina ceramic template slot; the crucible of the step (g) is made of alumina; the furnace of the step (g) has a heating procedure including the following four stages:

First Stage: heating slowly to the degree of 600° C.~650° C. in 2 hours (3~6° C./min), and holding the temperature for 30 to 60 minutes;

Second Stage: raising the temperature rapidly to the degree of 1150° C. to 1250° C. in 20~30 minutes (15~25° C./min), and holding the temperature for 10~30 minutes;

Third Stage: heating slowly to the degree of 1250° C.~1350° C. in 10~30 minutes (3~6° C./min), and holding the temperature for 1 to 3 hours; and Fourth Stage: dropping the temperature to 25° C. slowly by furnace cooling.

In one better embodiment, the macromolecular of the step (e) is polyethylene.

In one preferred embodiment, the porous ceramic composition is provided with nanopores or micropores and can be used as a biomaterial scaffold; the biomaterial scaffold is partially bioabsorbable. In one better embodiment, the biomaterial scaffold is used as artificial bone, and mixed with substances stimulating bone generation, wherein the substances stimulating bone generation is selected from the group consisting of bone marrow, BMP growth factor, angiogenesis factor, statin drugs, bisphosphanate drugs, bone cells, stem cells and their drug's carrier. In another preferred embodiment, the biomaterial scaffold is used as a carrier of a therapeutic agent. In one better embodiment, the therapeutic agent is an antibiotic drug.

EXAMPLE

The examples below are non-limiting and are merely representative of various aspects and features of the present invention.

Example 1

Synthesis of thermo-response hydrogel of poly(N-isopropylacrylamide-co-methacrylic acid)

The chemical formula of poly(N-isopropylacrylamide-co-methacrylic acid) (p(NIPAAM-MAA)) is shown as follow:

5 g (44.2 mmole) of N-isopropylacryamide (NIPAM, purchased from Aldrich) and 40 μl (0.4 mmole) of methacrylacryamide (MAA, purchased from Fluka) were placed in 100 ml round bottom flask, mixed and stirred with 30 ml double distilled water, and placed under 32° C. in water bath. 0.05 g of ammoniumpersulfat (APS, purchased from Riedel-de Haën) and 500 μl of N,N,N',N',-tetramethylenediamine (TEMED, purchased from Fluka) were serially added to the round bottom flask, and stirred uniformly for 4 hours, then the round bottom flask was removed from water bath and stirred contiguously at room temperature for 24 hours. After that, the mixture was drawn by the pipette to dialysis membrane (Mw: 1000) and proceeded dialysis for 8 hours. In order to exclude monomers, double distilled water was changed every two hours. After freeze drying for 24 hours, powder products of poly(N-isopropylacrylamide-co-methacrylic acid) were obtained and stored in room temperature. The production rate was about 70% to about 80%.

Slurry Preparation 1.25 g of hydroxyapatite (HAp, commercially available from Plasma Biotal Limited), which is pre-sintered at the degree of 800° C. in high temperature furnace, and 0.05 g of dispersant (polyacrylic acid) (PAA, commercially available from Aldrich) were mixed uniformly in a 50 ml beaker. Hydrogel solution of volume ratio 1:1 of poly(N-isopropylacrylamide-co-methacrylic acid) and double distilled water prepared in advanced was taken 1 ml into the beaker. The mixture in the beaker was mixed by the homogenizer. Finally, about 0.12 g of polyethylene particles (1000 μm) (PE, available from A Johnson Mathery (Alfa Aesar)) of total volume ratio of 5% were added to the beaker and stirred uniformly in manual.

Template Filling

Prepared slurry was filled into a porous template slot made of polyester fiber or alumina ceramic.

Heating Procedure of the Furnace

The curve of high temperature sinter was set into four steps:

First Stage: heated slowly to the degree of 650° C. in 2 hours (about 5° C./min), and held the temperature for 30 minutes;
Second Stage: raised the temperature rapidly to the degree of 1250° C. in 30 minutes (about 20° C./min), and held the temperature for 10 minutes;
Third Stage: heated slowly to the degree of 1300° C. in 10 minutes (about 5° C./min), and held the temperature for 2 hours; and
Fourth Stage: dropped the temperature to 25° C. slowly by furnace cooling.

Slurry and template disposed in alumina ceramic were sent into the high temperature furnace to proceed with sinter process after the high temperature furnace was set up.

Figure 1:
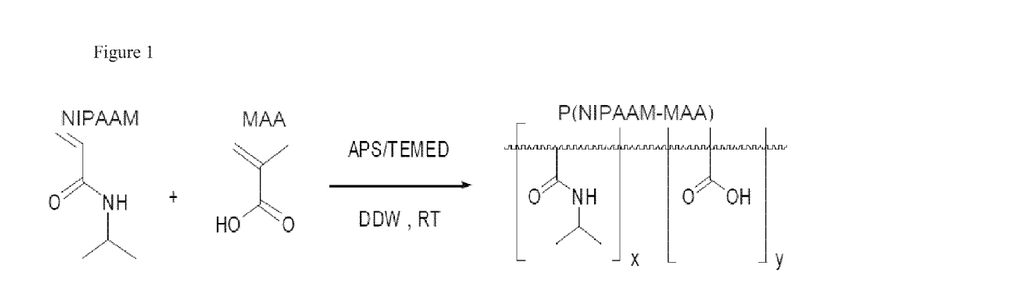
FIG. 1 shows a schematic diagram of synthesis of thermo-response hydrogel p(NIPAAM-MAA).
Figure 2:
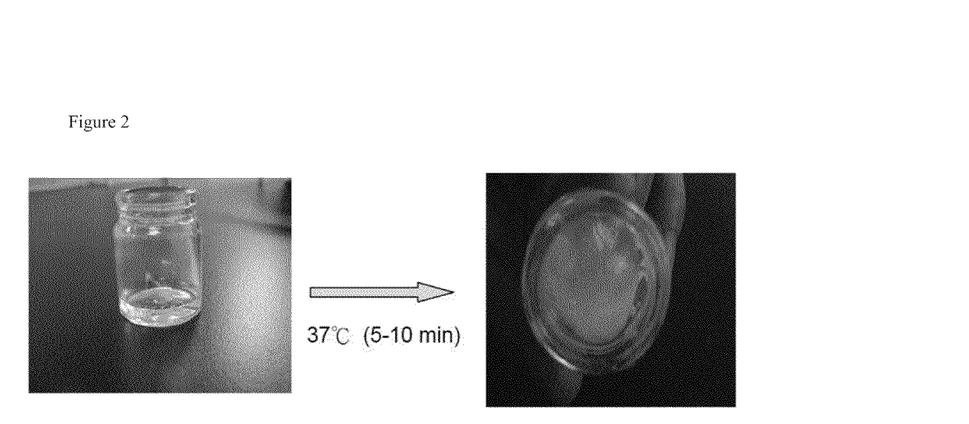
FIG. 2 shows a schematic diagram of thermo-response hydrogel p(NIPAAM-MAA) changing from sol to gel at 37° C.
Figure 3:
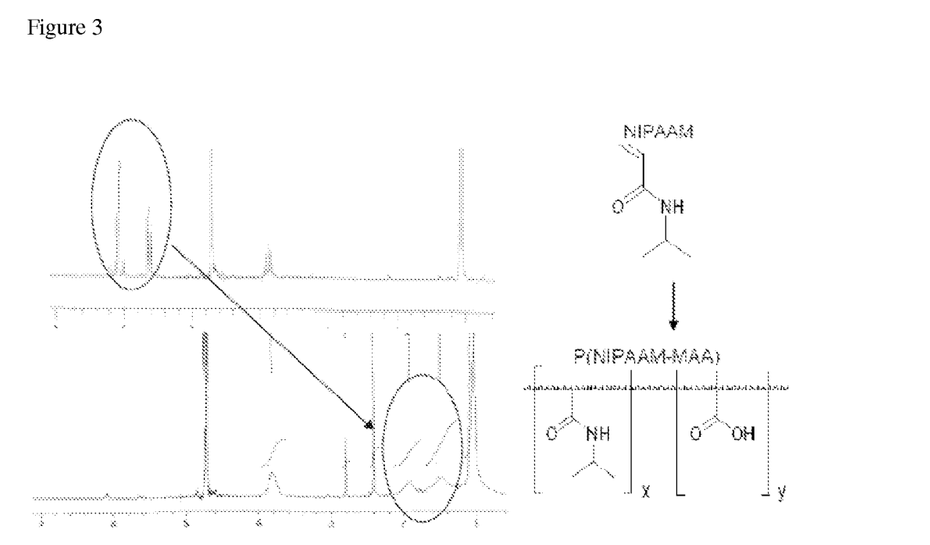
FIG. 3 shows an analysis of $^1$H NMR spectra of NIPAAM monomer and copolymer of p(NIPAAM-MAA), proving the double bond of NIPAAM monomer disappeared after addition polymerization.
Figure 4:
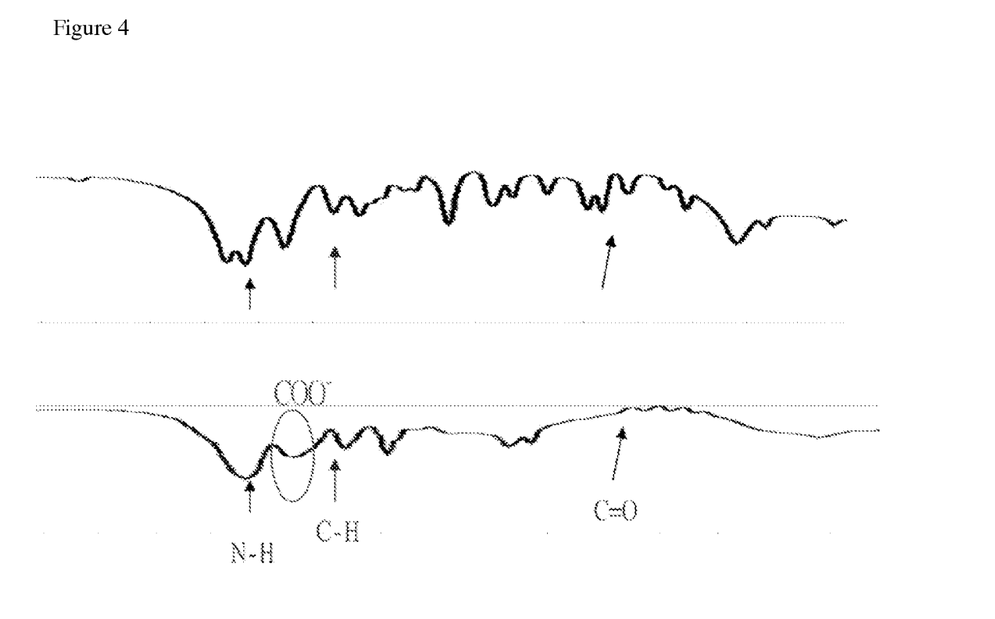
FIG. 4 shows a FTIR spectra analysis of NIPAAM monomer and copolymer of the p(NIPAAM-MAA), proving that the COOH group in co-polymer of p(NIPAAM-MAA) is the functional group of MAA.
Figure 5:
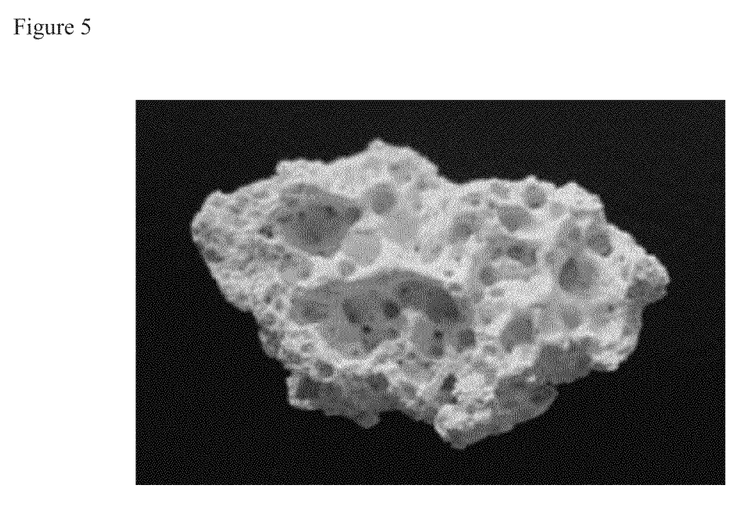
FIG. 5 shows a macroscopic photograph of porous hydroxyapatite bioceramic made by copolymer template of thermo-response hydrogel p(NIPAAM-MAA).
Figure 6:
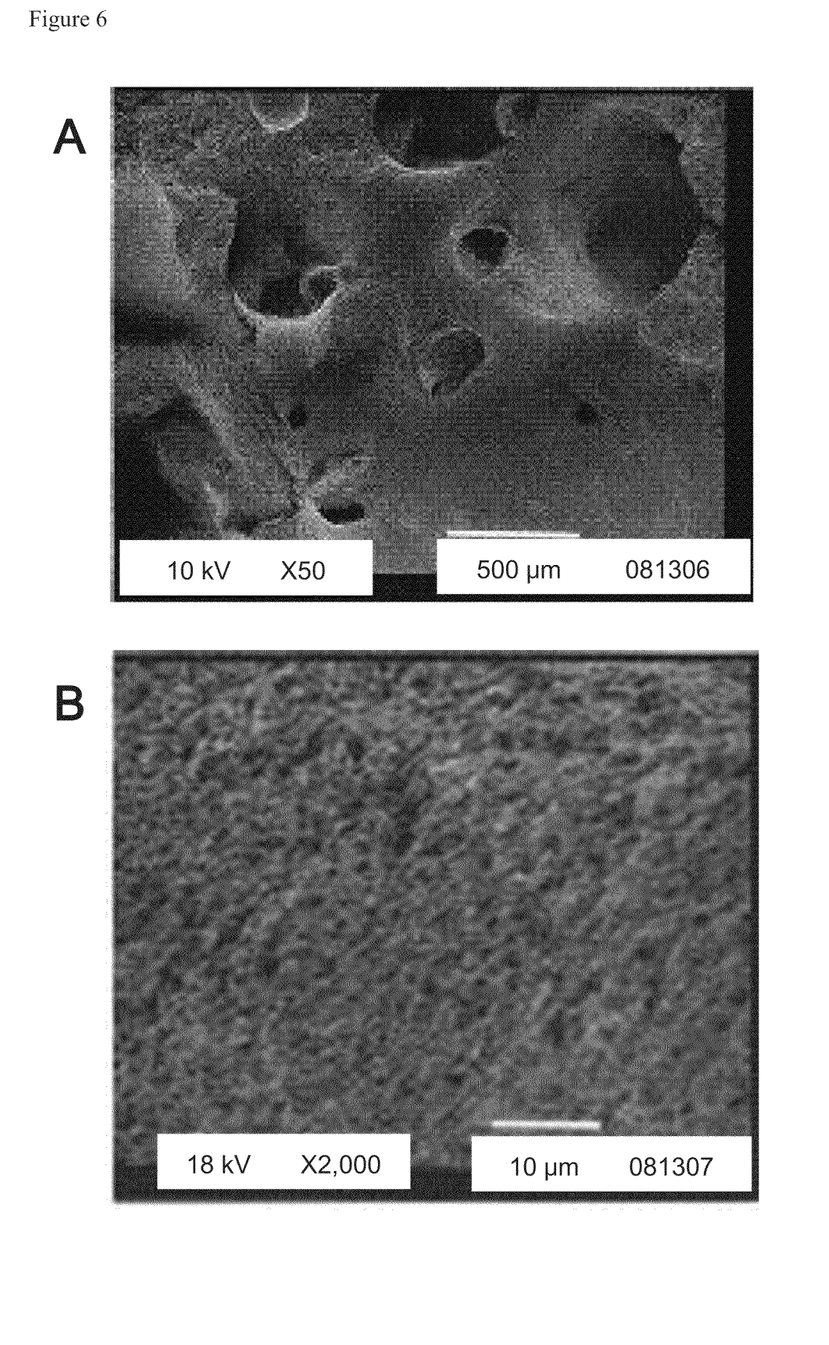
FIG. 6 shows microscopic SEM photographs of porous hydroxyapatite bioceramic made by copolymer template of thermo-response hydrogel p(NIPAAM-MAA) (FIGS. 6A and 6B show the micropores in different sizes, suggesting that the micro/nanopores are provided).
Figure 7:
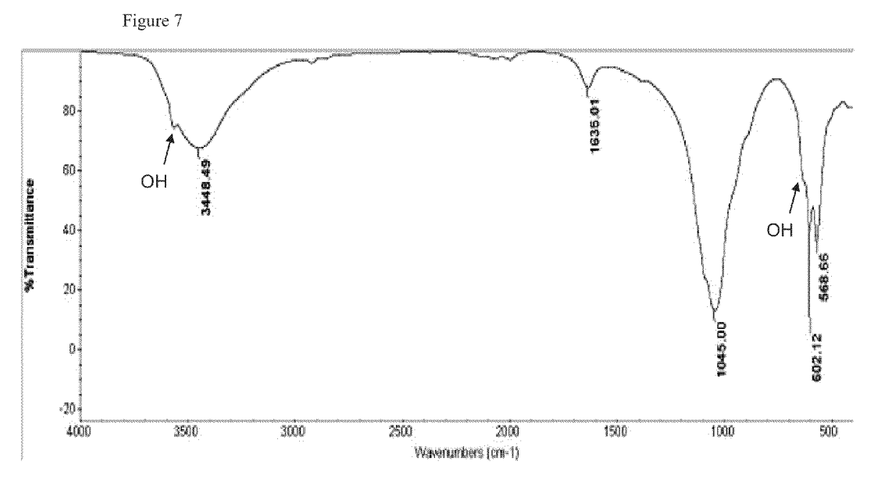
FIG. 7 shows a FTIR analysis of porous hydroxyapatite bioceramic made by copolymer template of thermo-response hydrogel p(NIPAAM-MAA), showing that the OH functional group has been lost.
Figure 8:
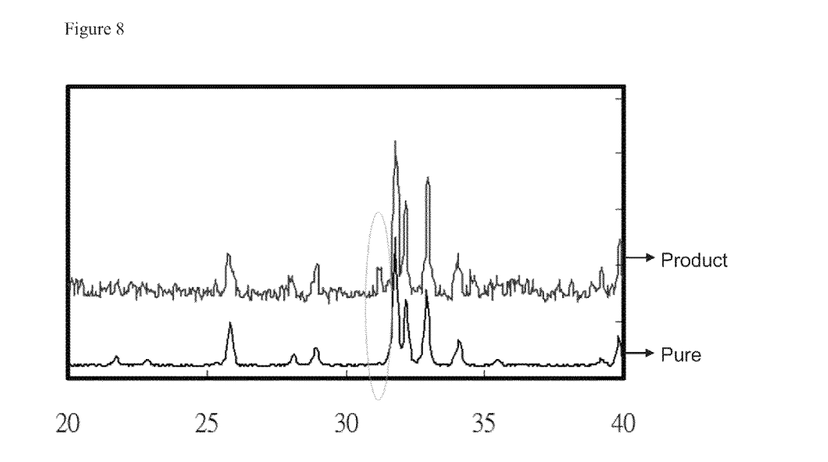
FIG. 8 shows a XRD analytic comparison between porous hydroxyapatite bioceramic made by copolymer template of thermo-response hydrogel p(NIPAAM-MAA) (product) and pure Hydroxyapatite (purity). It can be seen that the phase structure is mainly apatite structure, and partly β-TCP structure (main peak HAp; order peak β-TCP).

Synthesis and analysis of poly(N-isopropylacrylamide-co-methacrylic acid) are shown in FIG. 1 to FIG. 4. Image and analysis of porous hydroxyapatite after sintered are shown as FIG. 5 to FIG. 8.

One skilled in the art readily appreciates that the present invention is well adapted to carry out the objects and obtain the ends and advantages mentioned, as well as those inherent therein. The microspheres, and processes and methods for producing them are representative of preferred embodiments, are exemplary, and are not intended as limitations on the scope of the invention. Modifications therein and other uses will occur to those skilled in the art. These modifications are encompassed within the spirit of the invention and are defined by the scope of the claims.

It will be readily apparent to a person skilled in the art that varying substitutions and modifications may be made to the invention disclosed herein without departing from the scope and spirit of the invention.

All patents and publications mentioned in the specification are indicative of the levels of those of ordinary skill in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations, which are not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for preparing a composition comprising porous ceramic, comprising the following steps:
(a) synthesizing poly(N-isopropylacrylamide-co-methacrylic acid) (p(NIPAAM-MAA));
(b) mixing a dispersant with hydroxyapatite;
(c) mixing the p(NIPAAM-MAA) of the step (a) with water to obtain a hydrogel solution;
(d) mixing the hydrogel solution of the step (c) and product of the step (b) to produce a mixture;
(e) adding polyethylene particles to the mixture of the step (d) and stirring to produce a slurry;
(f) filling the slurry of the step (e) into a template slot; and (g) disposing the template slot filling with the slurry of the step (f) in a crucible, then heating the crucible in a furnace to form the composition comprising porous ceramic.

2. The method of claim 1, wherein the hydroxyapatite is mixed with the dispersant of the step (b) in a weight percentage ranges from 25:1 to 25:5.

3. The method of claim 1, wherein the dispersant of the step (b) is polyacrylic acid (PAA), polymethacrylic acid (PMA), or poly-vinyl-alcohol (PVA).

4. The method of claim 1, wherein the hydroxyapatite of the step (b) is sintered to the degree of 700° C.~900° C. in a high-temperature furnace before mixing the hydroxyapatite.

5. The method of claim 1, wherein the p(NIPAAM-MAA) is mixed with the water of the step (c) in a volume ratio ranges from 1:10 to 2:1.

6. The method of claim 1, wherein the polyethylene particles of the step (e) have a volume equal to 5%~50% of the total volume of the mixture of the step (d).

7. The method of claim 1, wherein the template slot of the step (f) is polyester fiber porous template slot or alumina ceramic template slot.

8. The method of claim 1, wherein the crucible of the step (g) is made of alumina.

9. The method of claim 1, wherein the step (g) of the furnace heating procedure contains four stages:
   First Stage: heating to the degree of 600° C. to 650° C. in 2 hours, and holding the temperature for 30 to 60 minutes;
   Second Stage: raising the temperature to the degree of 1150° C. to 1250° C. in 20 to 30 minutes, and holding the temperature for 30 minutes;
   Third Stage: heating to the degree of 1200° C. to 1350° C. in 10 to 30 minutes, and holding the temperature for 1 to 3 hours; and
   Fourth Stage: dropping the temperature to 25° C. by furnace cooling.

10. The method of claim 1, wherein the porous ceramic composition is used as scaffold of biomaterial.

11. The method of claim 10, wherein the biomaterial scaffold is partially bioabsorbable.

12. The method of claim 10, wherein the biomaterial scaffold is used as artificial bone.

13. The method of claim 10, wherein the biomaterial scaffold is used as a carrier of an antibiotic drug.

* * * * *